United States Patent [19]

Nijhuis

[11] Patent Number: 4,716,625

[45] Date of Patent: Jan. 5, 1988

[54] PROCESS AND DEVICE FOR STUNNING SLAUGHTER ANIMALS, IN PARTICULAR FOR STUNNING AND SUBSEQUENTLY STICKING SLAUGHTER ANIMALS

[75] Inventor: Gerrit J. Nijhuis, Winterswijk, Netherlands

[73] Assignee: Machinefabriek G. J. Nijhuis B.V., Netherlands

[21] Appl. No.: 819,373

[22] Filed: Jan. 16, 1986

[30] Foreign Application Priority Data

Jan. 21, 1985 [NL] Netherlands .................. 8500147

[51] Int. Cl.$^4$ .............................................. A22B 3/00
[52] U.S. Cl. ............................................ 17/45; 17/1 E
[58] Field of Search ...................... 17/1 E, 1 C, 11, 45

[56] References Cited

U.S. PATENT DOCUMENTS

| | | | |
|---|---|---|---|
| 3,163,884 | 1/1965 | Dunaway | 17/1 E |
| 4,031,591 | 6/1977 | Collins | 17/1 E |
| 4,578,841 | 4/1986 | Nijhuis | 17/1 E |
| 4,586,216 | 5/1986 | Grajoszex | 17/1 E |

FOREIGN PATENT DOCUMENTS

| | | |
|---|---|---|
| 0021548 | 6/1980 | European Pat. Off. . |
| 0067482 | 6/1982 | European Pat. Off. . |
| 3133990 | 8/1981 | Fed. Rep. of Germany . |
| 0192641 | 11/1967 | U.S.S.R. .............. 17/1 E |
| 0640728 | 1/1979 | U.S.S.R. .............. 17/1 E |

OTHER PUBLICATIONS

Search report of the Dutch examiner.

Primary Examiner—Willie G. Abercrombie
Attorney, Agent, or Firm—Arnold, White & Durkee

[57] ABSTRACT

This invention is a process and device for electrically stunning and stabbing of slaughter animals by using electrodes which from both sides grip round the snout of the animal and after stunning pull up the head to stretch its neck so that sticking of the carotid artery can take place into the property positioned neck by a properly positioned and guided knife which knife can be mounted upon an electrode.

24 Claims, 5 Drawing Figures

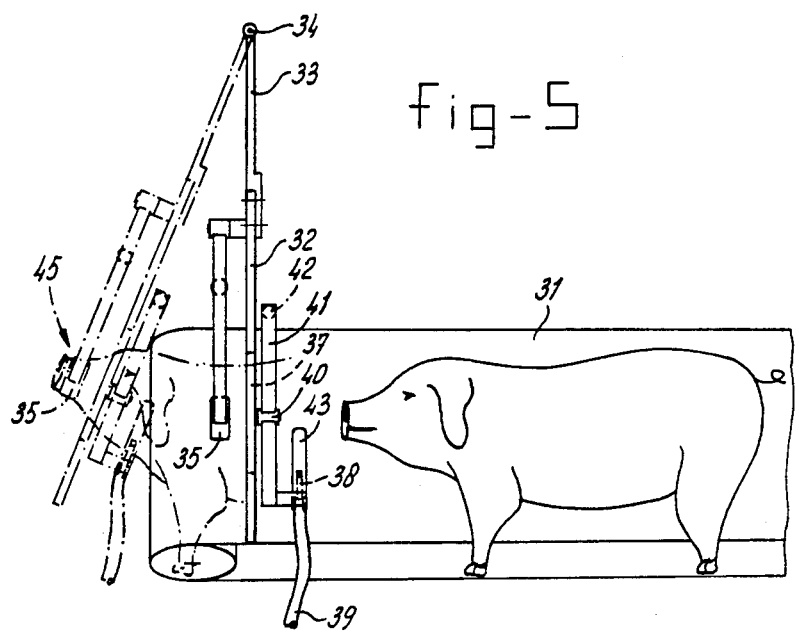
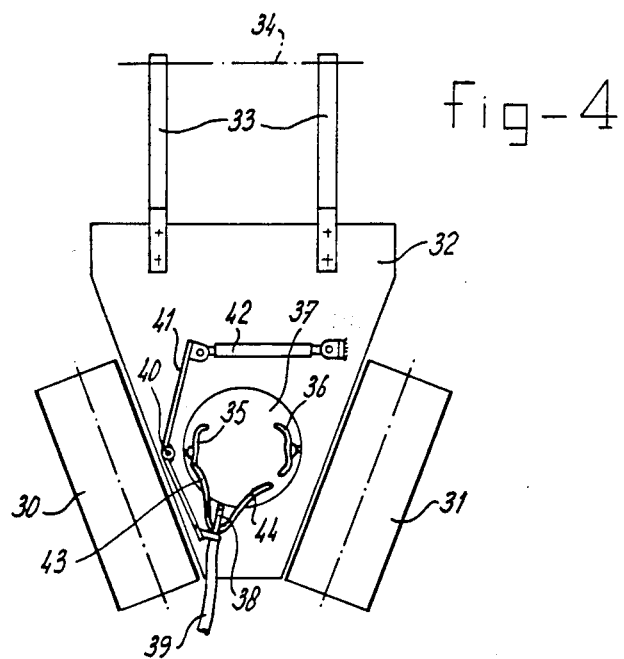

PROCESS AND DEVICE FOR STUNNING SLAUGHTER ANIMALS, IN PARTICULAR FOR STUNNING AND SUBSEQUENTLY STICKING SLAUGHTER ANIMALS

The invention relates in the first place to a process for electrically stunning and subsequently sticking slaughter animals, by means of two electrodes which are placed on either side of the head of the animal to be stunned, while the animal itself is in the passage of a conveyor, which comprises two endless conveyor belts which are placed opposite each other and grip the sides of the animal and convey it, the animal, after stunning, being stabbed in the carotid artery in order to bleed it.

Such a process is generally known and consists of the animals to be stunned being taken one by one, by means of a conveyor which grips the sides of the animal and carries it, to a place where there is an operator holding a stun rod, who places it on the head of the animal to be stunned before it leaves the conveyor. The stunned animal then falls from the conveyor onto a table, where operators fasten a chain to a hind leg, by means of which the animal is suspended from an upgoing chain conveyor which takes the animal into a vertical position with its head hanging down, in which position it is conveyed to the place for bleeding, where a knife is stuck into the carotid artery in order to bleed it, i.e. drain it of blood.

In this known process the stunning and sticking thus take place at two different places following one another in the slaughter line. With the existing stun rod, one can only stun, and with this manual stunning one is already satisfied if the stunning takes place without too many mistakes. Mistakes cause internal bleeding and/or bone breakage, which leads to meat of poorer quality, and the problems are really great if an animal comes out of the conveyor without being stunned and tries to escape.

Various proposals have already been made for automation of the stunning in order to improve it. Examples of this can be found in the published European Patent Applications Nos. 0,021,548 and 0,067,482.

In these known proposals there is in the passage of the conveyor, near the end thereof, a set of electrodes which can be moved into and out of the passage, or are suspended therein and are moved away or swung away by the stunned animal itself.

However, in these already known proposals, the sticking still always takes place at a later stage. The stunning is actually improved with these known automatic devices, but the contact between the head of the animal to be stunned and the electrodes takes place in the known proposals either through the weight of the electrodes or by spring pressure. This could be improved.

The object of the invention is then to produce in the first place a process which improves the stunning and sticking and a device with which in the first place the stunning can be further improved and in the second place the stunning and sticking can be combined, so that automation of the sticking becomes possible for the first time.

The process described above is now improved according to the invention in that the two electrodes are formed in such a way and placed and pressed round the head of the animal, in particular round the snout, that they partially enclose said head or snout and, after the stunning electric impulse is given by means of these two electrodes, the head is pulled up by these electrodes, in such a way that the neck is stretched, following which sticking takes place in this position of the head while the animal is still in the conveyor. In the simplest form this means that the man who is producing the stunning with a stunning rod now has on this stunning rod electrodes which can grip the head or snout in such a way that he can lift the head, so that the neck is stretched. In this position sticking can take place. It then takes place at a moment when the stunned animal has not yet been removed from the conveyor. Bleeding therefore begins at an early stage. If one has a freely projecting conveyor, of the type known per se, the chaining can already take place from underneath. If this is not the case, then the table onto which the already stuck animal falls is designed in such a way that this is taken into account. However, the latter involves no more than that the bleeding table, which is known per se, must be long enough and have a drainage facility. It is known per se—although less customary—to stick the stunned animals coming off the conveyor on the table on which they arrive and let them bleed there in the lying-down position.

The invention is now based on the idea that with an improved grip of the electrodes on the head—in particular the snout—of the animal to be stunned, the neck can be stretched and can be stuck there simultaneously.

The invention also extends to a device for the automatic stunning of slaughter animals, comprising a conveyor with two endless belts which are placed in such a way that there is a passage between them, and which can grip the animal to be stunned and move it forwards, and also comprising two electrodes which can be in the passage of the conveyor and can grip both sides of the head of the animal to be stunned. Examples of such a device can be found in European Patent Applications Nos. 0,021,548 and 0,067,482, which have been laid open for inspection. In these known devices the stunning is carried out by the animals for stunning, which are moved with the conveyor, being moved against the electrodes in the passage, following which these electrodes move with the moving animals and in contact with the sides of the head of said animals, with little or no difference in speed. After the stunning, the stunned animals slide under the electrodes, through the fact that they can swing far enough upwards and then fall off the conveyor, so that the electrodes can be moved back to their initial position, either controlled by means fitted for the purpose, or under the force of gravity. In this known device contact can now be improved through the fact that the electrodes are hingedly attached to carriers in such a way that the electrodes can be moved in a direction which is transverse to the direction of conveyance, and towards each other or away from each other, and these electrodes are connected to an operating mechanism, by means of which the electrodes can be moved towards each other in such a way that the head of the animal to be stunned can be subjected to clamping, and means are also present for moving the electrodes apart.

The moment at which the electrodes are clamped round the snout or head of the animal to be stunned can be determined in various ways. For example, use can be made of feel voltage, in other words, a low voltage which on contact of the electrodes with the head of the animal determines whether the body between the electrodes has the resistance of the animal in question. When this feel voltage flows, it can affect a control device in such a way that first of all the electrodes are clamped around the head or snout and only then is the stunning voltage applied.

It is advantageous here if the electrodes are shaped in such a way that each electrode is adapted to at least part of the shape of the side of the head or snout of the animal to be stunned, viewed in a cross section of the head or snout. This shape can be such that the electrodes are arched, with the hollows of the curves facing each other. By their shape and clamping, such electrodes ensure not only excellent contact, and thus good current flow while the stunning current impulse is being given, but they also hold the snout or head firmly.

Now the known devices are designed in such a way that the electrodes can swing upwards about a horizontal cross shaft. This upward swing can take place against the action of compression springs, can be controlled by pressure cylinders, depending on a signal to be given, and can take place by means of gravity if a hinge point which is high up is selected and the electrodes are fastened to a carrier which acts as a sling. By now using clamping electrodes according to the invention, one can use to advantage this upward movement, which can, of course, also be achieved in a way other than about a horizontal cross shaft. The upward movement of the electrodes clamping round the head or snout then automatically results in the neck being stretched and thus being ready for sticking.

Of course, after sticking the animal must be released, and the signal for this can be made dependent on the predetermined amount of upward movement of the electrodes. For example, after a particular angle of swing, the electrodes can receive a signal which puts the closing means out of action and activates the means which cause the electrodes to move apart. The closing means can be formed by a pressure cylinder, the return means by using a spring or by a double-acting cylinder.

Instead of using the feel voltage for closing the electrodes, other proximity switches can, of course, be used, i.e. infrared switches, radar switches and switching acting for the interruption of a light beam.

Since with the electrodes clamping round the head or snout the position of the head of the animal in such an automatic stunning device is determined precisely, sticking can now also be automated, by a knife being swivellably fastened on an electrode or the carrier of an electrode, with means for movement into and out of the path of the carotid artery of a head clamped by the electrodes. The knife can here be provided with guides which, for example, extend upwards in a V-shape from the knife to be moved upwards, and which first of all grip the sides of the neck and thus position the knife in the correct position relative to the carotid artery. The signal for actuating the means for making the knife carry out the sticking movement can then be derived from the completion of the stunning and/or the completion of a particular upward movement of the electrodes.

The invention will now be explained in greater detail below with reference to the drawings.

Figure 2:
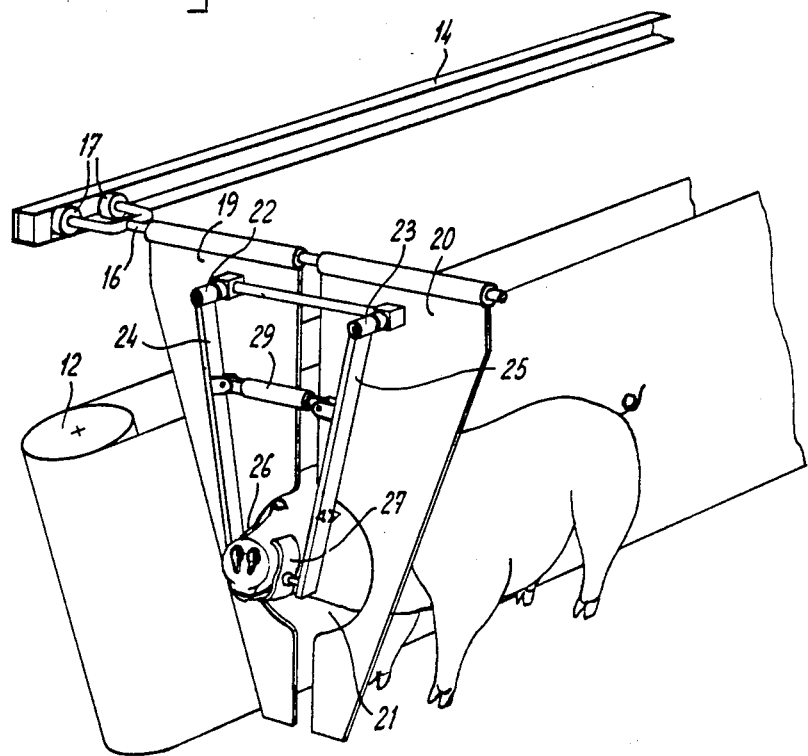
FIG. 2 shows schematically part of the device for carrying out the process according to the invention.
Figure 3:
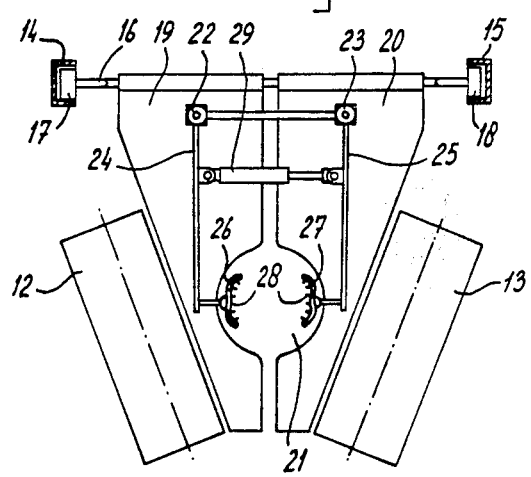

FIG. 3 is a front view of the device of FIG. 2.
FIG. 4 is a front view of another embodiment.
FIG. 5 is a side view of the embodiment of FIG. 4.
In FIGS. 2 and 5 one of the conveyors is left out.

Figure 1:
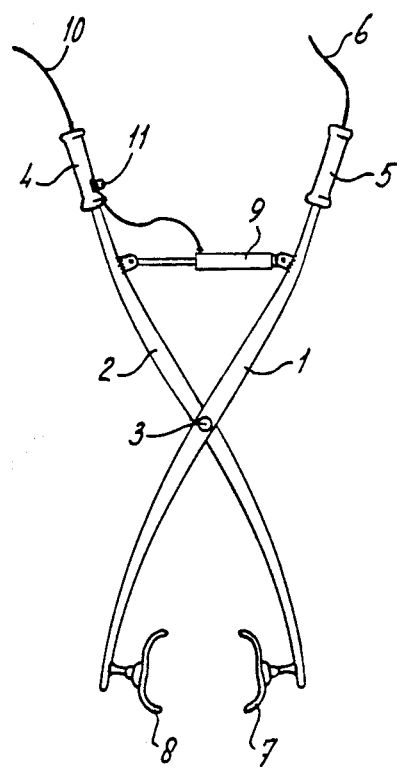
FIG. 1 shows schematically a hand-operated stunning rod with which the process according to the invention can be carried out.

FIG. 1 shows a stunning rod comprising two legs 1 and 2, which are hingedly connected to each other at 3, and are provided with handles 4 and 5 and a high-voltage connection by means of the cable 6 and an operating switch (not shown) which is accommodated, for example, in the handle 5.

The particular feature of the new stunning rod is that the electrodes are formed by curved strips 7 and 8, whose curvature is adapted to the shape of the part of the head of the animal where the electrodes have to be applied, for example halfway along the snout of a pig. Through the curved shape of the electrodes 7 and 8—which if desired can be connected flexibly with the fork legs 1 and 2, so that adaptation to the position of the electrodes is possible when the head is clamped—the head is held firmly.

This makes it possible to pull the head upwards and thus to stretch the neck. If desired, a pressure cylinder 9 can also be fitted between the legs 1 and 2 of the stunning rod, to which cylinder compressed air can be fed via the hose 10 and a push button switch 11, said cylinder acting as an aid in clamping of the head.

In the embodiment of FIGS. 2 and 3, the device shows two endless conveyors 12 and 13, only one of which is shown in FIG. 2. Such a conveyor is generally known. Above this conveyor is a rail track 14, 15 in which is movably conducted a carrier 16 with the aid of wheels 17 and 18. Attached to it, swivellably about a cross shaft, is a set of electrode plates 19 and 20, which can function in the known way as electrodes, if within the scope of the invention, generally only for the application of the feel voltage, and which also serve to guide the head of the animal. To this end, these electrode plates 19 and 20 are designed in such a way that they fill the passage practically completely, with the exception of an opening 21.

On these electrode plates 19 and 20 at 22 and 23, arms 24 and 25 are now fixed hingedly about pins which run parallel to the direction of conveyance. These arms 24, 25 carry electrodes 26, 27 which are curved and may be provided with contact points 28. Between the arms 24 and 25 is a pressure cylinder 29 with which the electrodes 26 and 27 can be moved apart or towards each other.

FIG. 2 shows how the snout of an animal, projecting through the opening 21, is gripped by the electrodes 26 and 27 and clamped, following which the stunning electric impulse is given.

It will also be clear in particular from FIG. 2 that when the animal is moved further forward by means of the conveyors 12, 13 the travelling carrier, as soon as it comes against a stop and cannot move any further, permits the animal with clamped snout to be swung upwards by the electrodes. Through the clamping of the snout, the neck is stretched and it is therefore easy to stab the carotid artery from underneath.

The latter process can be automated, as indicated in the embodiment of FIGS. 4 and 5.

These figures show an embodiment with conveyors 30 and 31, between which is suspended a plate 32 from carrier arms 33, which are suspended so as to be freely swivellable about a pin 34. Fastened on this plate 32 there are again electrodes 35, 36, for example in the manner shown in FIG. 3, but for the sake of clarity this is not shown in detail. The plate has a central opening 37 through which the animal can project with its snout. When this takes place it can be clamped by the electrodes 35 and 36. FIG. 5 shows the plate 32 in the rest position with downstream of the opening 37 the electrodes 35 and 36 acting as clamps. Shown on the rear side of the plate 32, thus upstream thereof, is a knife 38, for example a hollow knife which can be connected to a discharge hose 39. This knife 38 is fastened to an arm 41 which hinges at 40, and which is connected to an operating cylinder 42. Guide braces 43 and 44 can be fastened to this knife 38.

FIG. 5 indicates by dotted lines at 45 that on further movement of the animal through the conveyor the snout clamped by the electrodes of necessity has to move upwards, so that the knife can then be stuck into the neck, in which process it can be directed to the correct position by the guides 43, 44. For this a flexible fastening of the knife is needed, which can be produced by fastening the knife to the arm 41 with, for example, a rubber connecting piece.

It will be clear that many variations on this theme are possible.

I claim:

1. A process for electrically stunning and subsequently sticking slaughter animals, by means of two electrodes which are placed on either side of the head of the animal to be stunned, while the animal is in the passage of a conveyor having two endless conveyor belts which are placed opposite each other and which grip the sides of the animal to convey it, comprising the steps of:

stunning an animal with an electric impulse given by means of two electrodes shaped so that the electrodes partially enclose the animal's head when the electrodes are placed round the head of the animal;
   pulling the animal's head up by the electrodes in such a way that the neck is stretched;
   sticking the animal in the carotid artery while the head of the animal is being maintained in a position where the neck is stretched due to the pulling by the electrodes and while the animal is still in the conveyor.

2. A method of stunning animals to be slaughtered using electrodes adapted to position the animal's neck for stabbing, comprising the steps of:

holding an animal in a V-shaped restrainer;
   passing a stunning current through the head of the animal using electrodes to stun the animal prior to slaughtering;
   gripping the head of the animal with the stunning electrodes; and,
   stretching the neck of the animal by using the electrodes to urge the animal's head to tilt upwardly, thereby positioning the animal's neck for stabbing and subsequent bleeding.

3. The method according to claim 2, further comprising the steps of:

stabbing the animal's neck while the animal's neck is gripped by the electrodes and stretched by tilting the animal's head upwardly; and,
   bleeding the animal.

4. The method according to claim 3, further comprising the step of:

automatically guiding a means for sticking the animal into an effective stabbing position relative to the neck of the animal using a V-shaped guide means.

5. The method according to claim 2, claim 3 or claim 4, further comprising the step of:

constructing two electrodes for passing the stunning current through the head of the animal where the electrodes are shaped to conform to the shape of the head of the animal in order to facilitate gripping the head of the animal.

6. The method according to claim 3, wherein:

the step of stabbing the animal's neck occurs while the animal is being held in the V-shaped restrainer.

7. Apparatus for the automatic stunning of slaughter animals, comprising:

a conveyor with two endless belts which are placed in such a way that there is a passage between the belts and which can grip an animal to be stunned and move it forwards;
   two electrodes in the passage of the conveyor and adapted to grip both sides of the head of the animal to be stunned, the electrodes being hingedly attached to carriers in such a way that the electrodes can be moved in a direction which is transverse to the direction of conveyance, towards each other or away from each other;
   an operating mechanism connected to the electrodes, the operating mechanism being operable to move the electrodes towards each other in such a way that the head of the animal to be stunned can be subjected to clamping; and,
   means for moving the electrodes apart.

8. The apparatus according to claim 7, wherein:

the electrodes are shaped to conform to at least part of the shape of the side of the head or snout of the animal to be stunned, viewed in a cross section of the head or snout.

9. The apparatus according to claim 8, wherein:

the electrodes are arched and the curves of the arched portion of each electrode forming a hollow area facing the other electrode being adapted to receive the head of an animal.

10. The apparatus according to claim 7, claim 8 or claim 9, wherein:

the electrodes are attached to carriers by means of which the electrodes can be moved upwards, means for removing the clamping action exerted by the electrodes after the electrodes have moved upwards over a predetermined distance.

11. The apparatus according to claim 7, claim 8 or claim 9, further comprising:

a knife swivelably supported by the carrier of an electrode; and, means for movement of the knife into and out of the path of the carotid artery of an animal's head held clamped by the electrodes.

12. The apparatus according to claim 11, wherein:

the knife is provided with guiding means which guide the knife to a correct position during its swing towards the neck, by gripping the neck of the animal.

13. The apparatus according to claim 12, wherein:

the means for moving the knife into the correct position depend on a signal which indicates that the stunning has been completed.

14. An apparatus for stunning an animal, comprising:

a conveyor having two endless conveyor belts which are placed opposite each other and which grip the sides of an animal to convey it;
    means for stunning the animal with an electric impulse given by means of two electrodes shaped so that the electrodes partially enclose the animal's head when the electrodes are placed round the head of the animal;
    means for pulling the animal's head up by the electrodes in such a way that the neck is stretched;

means for sticking the animal in the carotid artery while the head of the animal is being maintained in a position where the neck is stretched due to the pulling by the electrodes and while the animal is still in the conveyor; and, hand-operated stunning tongs, having two arms which are hingedly connected to each other, the arms each having a long portion and a short portion, between a respective end of the arm and the hinge point, the arms having handles on the long portion of the arms, while the short portion of the arms are provided with said electrodes, the electrodes being arched with hollow sides facing each other and with an operating cylinder between the long portion of the arms.

15. The apparatus according to claim 10, further comprising:
a knife swivelably supported by the carrier of an electrode; and,
means for movement of the knife into and out of the path of the carotid artery of an animal's head held clamped by the electrodes.

16. The apparatus according to claim 10, wherein:
the means for moving the knife into the correct position is actuated responsive to a signal which indicated that the stunning has been completed.

17. The apparatus according to claim 11, wherein:
the means for moving the knife into the correct position is actuated responsive to a signal which indicates that the stunning has been completed.

18. Apparatus for stunning animals to be slaughtered having electrodes adapted to position the animal's neck for stabbing, comprising:
electrode means for passing a stunning current through the head of an animal to stun the animal prior to slaughtering; and,
said electrode means including concave snout gripping means for gripping the snout of the animal to stretch the neck of the animal by urging the snout upwardly, thereby positioning the animal's neck for stabbing and subsequent bleeding.

19. The apparatus according to claim 18, further comprising:
sticking means for stabbing the animal's neck while the animal's snout is held by said snout gripping means and while the animal's neck is stretched by said snout gripping means, in order to bleed the animal.

20. An apparatus for stunning animals to be slaughtered having electrodes adapted to position the animal's neck for stabbing, comprising:
electrode means for passing a stunning current through the head of an animal to stun the animal prior to slaughtering;
said electrode means including gripping means for gripping the snout of the animal to stretch the neck of the animal by urging the snout upwardly, thereby positioning the animal's neck for stabbing and subsequent bleeding;
sticking means for stabbing the animal's neck while the animal's snout is held by said gripping means and while the animal's neck is stretched by said gripping means, in order to bleed the animal; and,
V-shaped guide means mechanically linked to said sticking means for guiding said sticking means to an effective stabbing position relative to the neck of the animal.

21. The apparatus according to claim 20, wherein: the sticking means comprises a knife.

22. The apparatus according to claim 20 or claim 21, wherein:
the electrode means comprises two electrodes shaped to conform to the shape of the head of the animal in order to hold the animal's snout firmly.

23. The apparatus according to claim 22, further comprising:
an operating mechanism connected between the two electrodes and being operable to urge the electrodes toward each other to clamp the animal's head in said gripping means.

24. The apparatus according to claim 23, further comprising:
a carrier for supporting the electrodes, the carrier being operable to move the electrodes in tandem with the animal during stunning.

* * * * *